H. N. TYSON.
SURFACE BROADCASTER.
APPLICATION FILED DEC. 3, 1917.

1,284,162.

Patented Nov. 5, 1918.

WITNESSES

INVENTOR
Homer N. Tyson
BY
ATTORNEY

UNITED STATES PATENT OFFICE.

HOMER N. TYSON, OF TELFORD, WASHINGTON.

SURFACE-BROADCASTER.

1,284,162.  Specification of Letters Patent.  Patented Nov. 5, 1918.

Application filed December 3, 1917. Serial No. 205,172.

*To all whom it may concern:*

Be it known that I, HOMER N. TYSON, a citizen of the United States, residing at Telford, in the county of Lincoln and State of Washington, have invented certain new and useful Improvements in Surface-Broadcasters, of which the following is a specification.

This invention relates to a broad caster and more particularly to a device for attachment to a seeder whereby the seeds may be cast evenly and uniformly on the ground surface.

One of the principal objects of the invention is to provide a surface type of broad caster connected with the seed tubes of an ordinary seeder which will sow or cast the seeds and cover them with a quantity of earth when relatively shallow planting is desired.

A further object of this invention is the provision of a broad caster which consists of comparatively few parts and is simple in construction, but durable and well adapted to withstand the rough usage to which devices of this character are ordinarily subjected.

For a full description of the invention and the advantages and merits thereof, reference is to be had to the following description and the accompanying drawings, wherein is illustrated the preferred form of my invention, in which.

Figure 1:
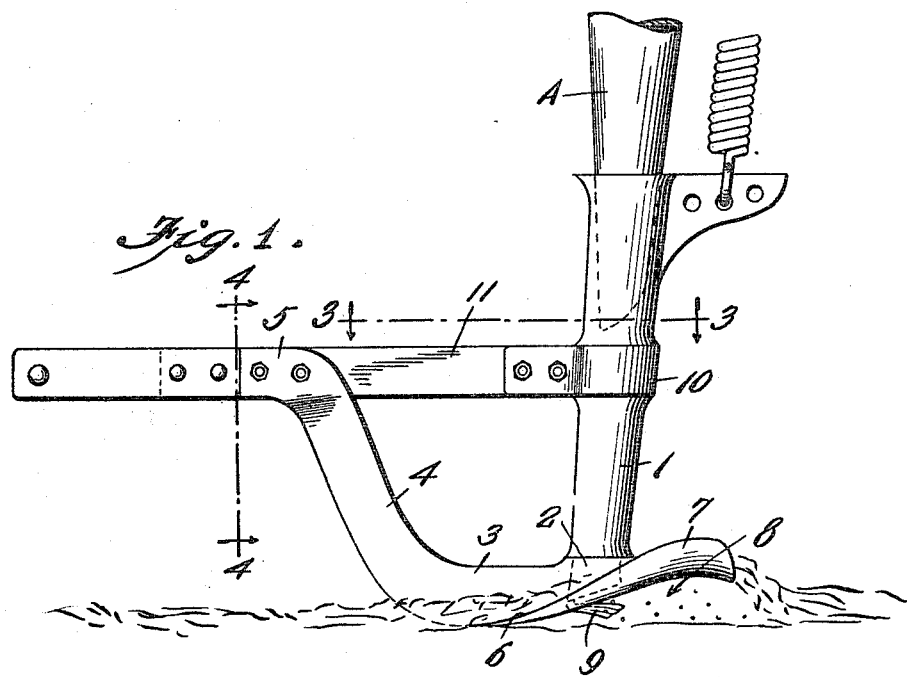
Figure 1 is a detailed side elevation of one of the devices.
Figure 2:
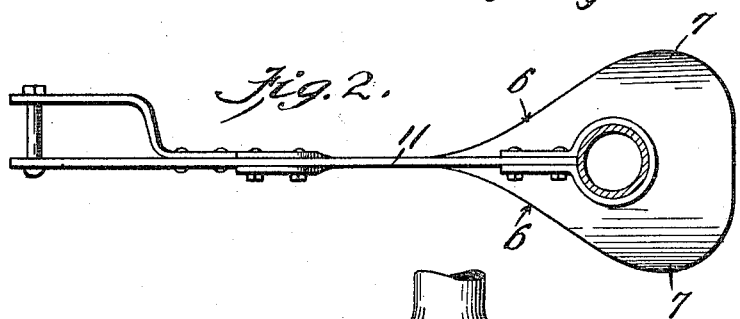
Fig. 2 is a section on the line 2—2 of Fig. 1.
Figure 3:
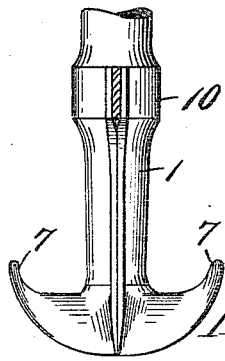
Fig. 3 is a section on the line 3—3 of Fig. 1.

Referring particularly to Figs. 1, 2 and 3 the attachment includes a seed duct 1 which is adapted to be attached to the seed tube A, a plurality of which depend from the seeder with which the devices will be used. At the lower end of the seed duct 1 is shovel 2 and in this type of broad caster, the shovel operates near the surface of the ground to raise a comparatively small quantity of earth to cover the seeds. The shovel, therefore, must be of a certain design and construction and it will be noted that the forward end is provided with a longitudinal rib 3 which merges into the point of the shovel and is projected outwardly to form an arm 4. This arm is curved upwardly at an angle and is then turned forwardly to provide the flange 5. At the forward end of the shovel blade, at each side of the rib 3, the shovel is tapered and the edges 6 of these tapered portions are sharpened to facilitate passage of the shovel through the soil. This pointed end of the shovel and the sharpened edges cause the shovel to lift a quantity of earth from the earth's surface when the device is moved forwardly as shown to advantage in Fig. 2 of the drawing. Slightly rearwardly of the point at which the seed duct joins the shovel, the latter is increased in width and its outer edges are curved upwardly to provide the retaining flanges 7 and the rear end of the shovel is slightly curved downwardly but terminates at a point above the natural surface of the ground. This construction of the shovel causes the earth, gathered up by the shovel, to be elevated and deposited over the rear of the shovel so that during operation, a planting space 8 is maintained beneath the shovel.

Attached to the lower end of the seed duct 1 is a seed caster which includes the corrugated plate 9 projecting rearwardly and adapted to throw or cast the seeds into the space 8 so that they will be spread over the space where they may be covered by the earth as it falls over the rear end of the shovel or blade.

A yoke 10 is attached to the seed duct 1 intermediate its ends and this yoke is fixed to a beam 11 which projects forwardly and has the flange 5 secured thereto. The forward end of this beam 11 may be attached to the draft of the seeder so that the seed tube A will aline with the seed duct 1.

From the foregoing, it will be observed that a very simple and durable broad caster has been provided, and the details of which embody the preferred form. I desire it to be understood, however, that slight changes in the minor details of construction may be made without departing from the spirit of the invention or the scope of the claims hereunto appended:

1. A surface broad caster including a shovel blade having its forward end provided with a longitudinal centrally located rib, the blade being pointed and merging into the said rib, the tapered edges of the blade being sharpened, the rear end of the blade being relatively wide and having its side edges curved upwardly to provide retaining flanges, the rear end of the shovel being slightly curved downwardly and provided with an unbroken surface between the side flanges whereby the latter will guide the soil received on the blade over the said downwardly curved rear edge thereof and directly behind the center of the said blade.

2. A surface broad caster including a shovel blade having its forward end provided with a longitudinal centrally located rib, the blade being pointed and merging into the said rib, the tapered edges of the blade being sharpened, the rear end of the blade being relatively wide and having its side edges curved upwardly to provide retaining flanges, the rear end of the shovel being slightly curved downwardly and provided with an unbroken surface between the side flanges whereby the latter will guide the soil received on the blade over the said downwardly curved rear edge thereof and directly behind the center of the said blade, and a corrugated plate disposed beneath the blade and projecting rearwardly in the space beneath the raised end of the blade.

In testimony whereof I affix my signature in presence of two witnesses.

HOMER N. TYSON.

Witnesses:
L. F. HILL,
E. M. HILL.

Copies of this patent may be obtained for five cents each, by addressing the "Commissioner of Patents, Washington, D. C."